June 3, 1952 W. D. MACGEORGE ET AL 2,599,005
PLURAL SCALE INDICATOR
Filed April 7, 1948 3 Sheets-Sheet 1
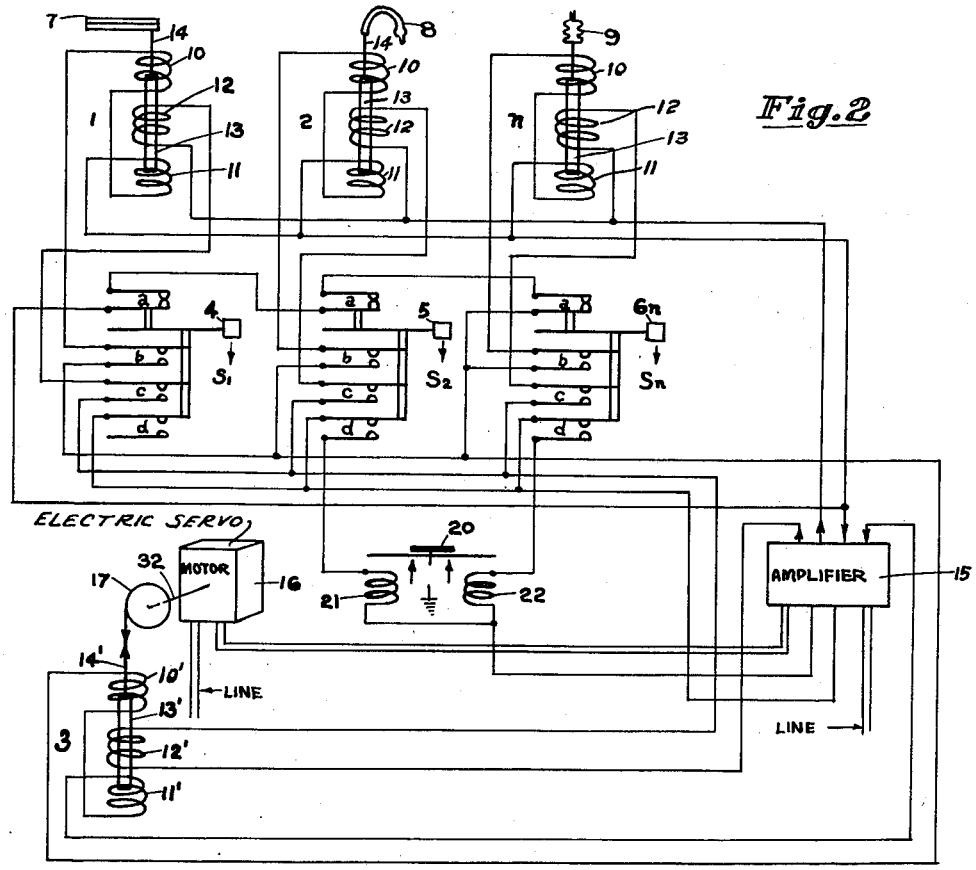
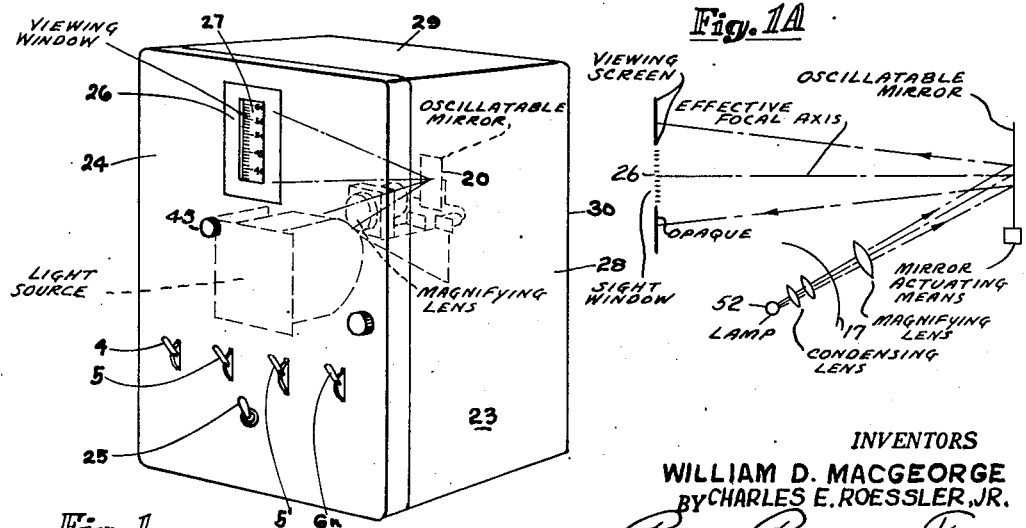
INVENTORS
WILLIAM D. MACGEORGE
BY CHARLES E. ROESSLER, JR.
ATTORNEY

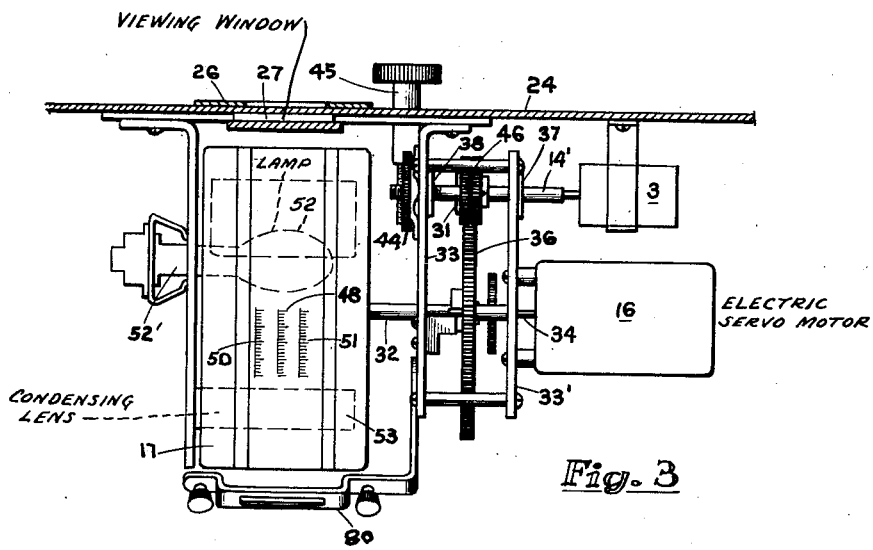
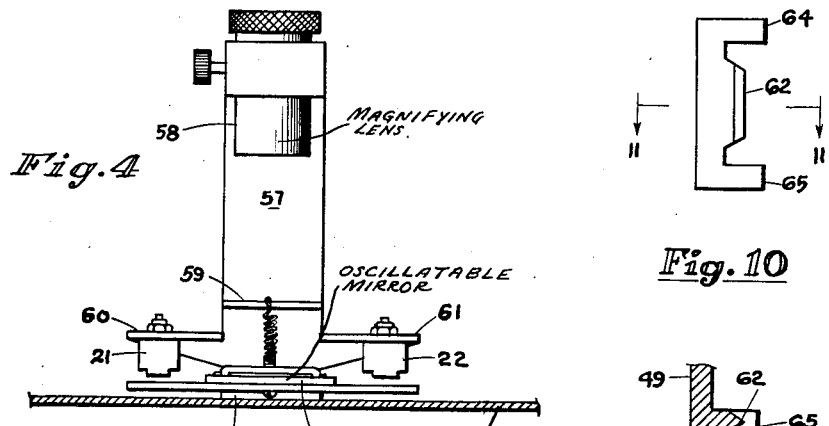
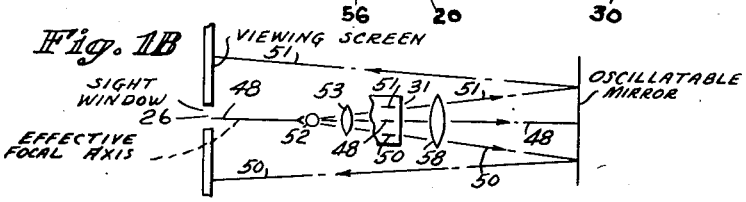
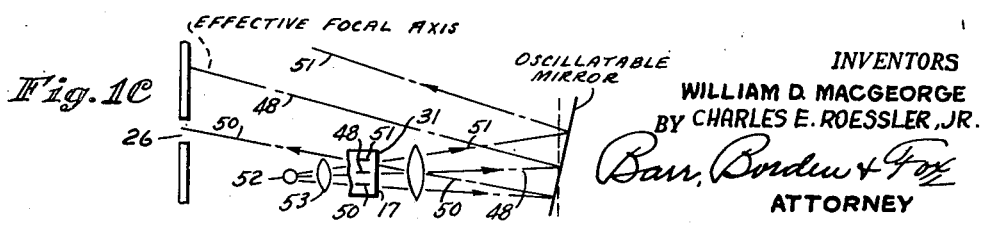

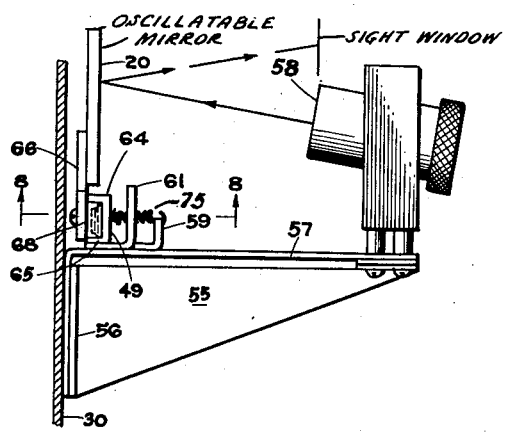
Fig. 5
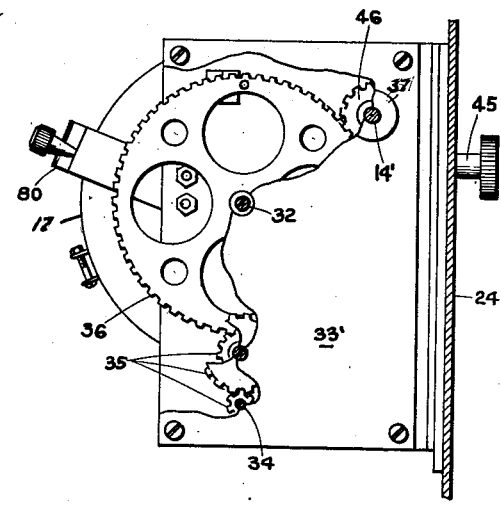
Fig. 6
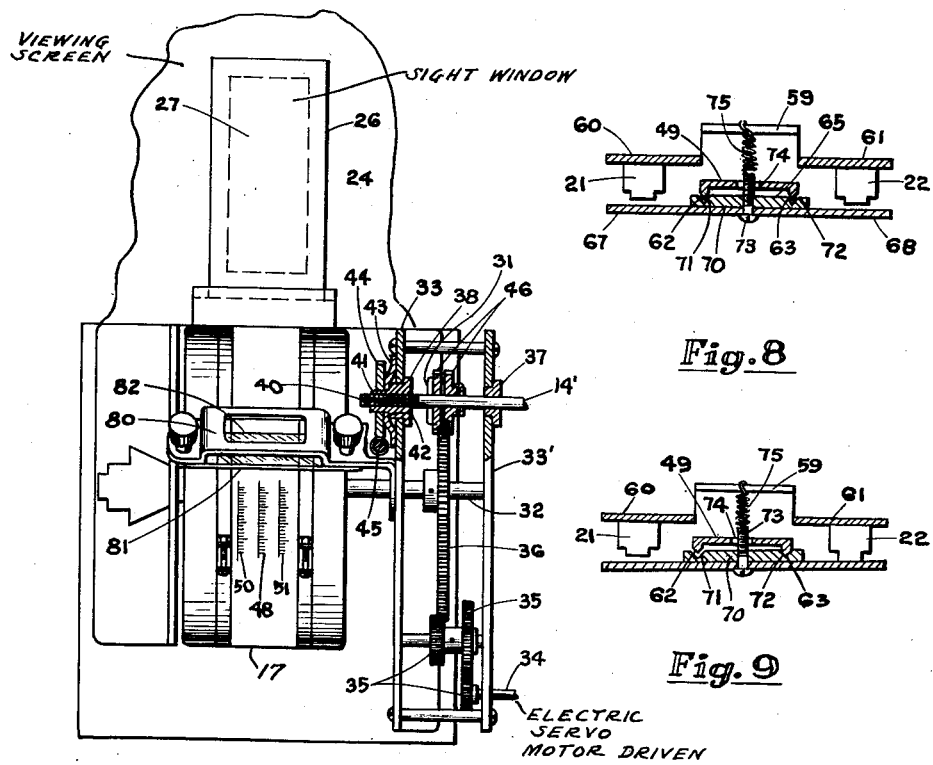
Fig. 7
Fig. 8
Fig. 9
INVENTORS
WILLIAM D. MACGEORGE
BY CHARLES E. ROESSLER, JR.
ATTORNEY Patented June 3, 1952

2,599,005

UNITED STATES PATENT OFFICE 2,599,005

PLURAL SCALE INDICATOR

William Dean Macgeorge, Havertown, and Charles E. Roessler, Jr., Philadelphia, Pa., assignors to Automatic Temperature Control Co., Inc., Philadelphia, Pa., a corporation of Pennsylvania Application April 7, 1948, Serial No. 19,486

11 Claims. (Cl. 177—351)

This invention relates to plural scale indicators, and particularly to a clustered indicator arranged to display selectively a plurality of independent conditions at a common point.

As indicating systems have developed hitherto, each conditioned device of a plurality of such devices has had separate indicating means of rather cumbersome nature, in separate and independent boxes or housings, necessarily requiring great wall area for display, and having no means for quick comparison of two or more conditions nor for plural respective indications at a common point.

It is among the objects of this invention: to improve indicators; to provide an improved indicator by which a plurality of independent control or condition-responsive variables are integrated into a single unit and arranged for selective actuation to indicate any given selected condition or variable; to improve the circuits in indicating systems; to provide a composite indicator for a plurality of more or less independent controlling or controlled devices so arranged that a visual record is observed or projected for the purpose of observation and comparison of successive or alternate conditions; to provide a common indicating means having relatively small calibrations with means for viewing a magnified portion of the calibrations as a function of a selected variable of a plurality of variables.

Other objects and advantages of the invention will become more apparent as the description proceeds.

In the accompanying drawings:

Fig. 1 represents a perspective of the indicator unit according to a preferred embodiment, showing in broken lines internally of the housing the individual components comprising the unitary indicator.

Fig. 1A represents a diagram of a side elevation of the beam projection.

Fig. 1B represents a diagram of a top plan of the beam projection with the reflector set for a normal projection by which a selected scale of a plurality of scales is viewed, in the viewing window.

Fig. 1C represents a similar diagram with the reflector cocked to change the angle of incidence of the projected beam toward the sight window, by which a different selected scale of the plurality of scales is viewed in the viewing window.

Fig. 2 represents an illustrative wiring diagram for the composite indicator.

Fig. 3 represents a plan of the responsive indicating unit including a calibrated drum actuated in accordance with an instant selected condition, mounted on a fragment of the front panel of the housing of the indicator, with the latter shown in section.

Fig. 4 represents a plan of the mounting for the magnifying lens of the device, showing the oscillatable reflector unit thereof, mounted on a fragment of the rear panel of the housing, with the latter shown in section.

Fig. 5 represents a side elevation of the assembly of Fig. 4 with the supporting panel of the housing shown in fragmentary section with electromagnets removed for clarity.

Fig. 6 represents a fragmentary side elevation of the assembly of Fig. 3.

Fig. 7 represents a fragmentary elevation partially in section of the indicator drum assembly and the viewing window, as seen looking horizontally of the indicator housing.

Fig. 8 represents a detail of the oscillatable mirror and its mount in a vertical position.

Fig. 9 represents a detail of the oscillatable mirror and its mount is a cocked position.

Figs. 10 and 11 represent details.

The fundamental circuit arrangement of the indicator of this invention, according to a preferred embodiment thereof, utilizes a plurality of separate pick-up units, each comprising a differential transformer, each of which has a floating armature, the position of which is controlled by a given variable such as the condition of a particular conditioned device with which it is associated, and each of which is capable of unbalancing a circuit on either side of a null or balanced output in accordance with the instantaneous relative position of the armature to the stator of the differential transformer. These portions of the device may be designated as transmitter or pick-up units. The unbalance of the transformer circuit is manifested by an output of a voltage of a given phase from the secondaries of a single selected transformer, which, after suitable amplification, is incident upon a two phase motor common to all transmitters in alternation or selective succession, to run it in one direction or the other, according to the phase of the output of the selected transformer, as a manifestation of a change of condition or of attainment of a given condition in its associated conditioned device. This functioning is by a physical relative movement of the armature. The motor, in running, is caused to physically move the armature of a second differential transformer common to all transmitter units in alternation or selected succession until the output of the second transformer equals and thereby cancels or nullifies the output of the particular selected transmitter transformer. The distance traveled by the motor represents a function of the change of condition of the selected conditioned device, i. e. the instant value of the variable, as an indication thereof for signal and circuit balancing purposes. The motor may also, of course, be coupled with a control device affecting the regulation of the condition or variable modulating supply of the condition device, to modify same to restore a desired condition. Such a circuit with a single transmitter or pick-up unit in circuit with a single receiver unit, and the preferred forms of differential transformers of the circuit are shown, illustratively, in the Hornfeck Patent No. 2,420,539, to which reference may be made for any necessary details not fully developed herein.

By the invention herein, a plurality of transmitters of pick-up units are provided, with one common receiver or balancing unit and one common motor, with means for selectively keying a selected transmitter to the common receiver, and with common means effecting a visual indication of the motor travel in effecting balance between the selected transmitter and the receiver unit, as a function of the initial unbalance, or variable change.

Referring now to Fig. 2, an illustrative circuit for an illustrative infinite number of transmitters is shown. Each transmitter transformer preferably comprises a pair of axially spaced secondaries 10 and 11 coupled in bucking relation, separated axially by a primary exciting coil 12. The coils are all hollow and axially aligned to form a central core aperture within which the armature mess 13 is positioned and has axial motion. The position of the armature is controlled by the position of the link 14 extending to and operative by a condition-responsive element operatively associated with a conditioned device. These devices, subject to varying conditions, may be of any desired sort, and the list of variables may be as recited or shown, for instance, in said Hornfeck patent mentioned, and a condition-responsive element effected by any one of said variables may be considered as coupled to the actuating end of the link 14. Illustratively, the variables include flow, pressure, temperature, humidity, electromotive force and position responsive devices. When the armature is symmetrically disposed electrically and in the center of the transformer, the output of the coupled secondaries thereof is null, while relative physical movement of the armature of the transmitter in one direction from null gives an output of voltage of A phase, while movement in the other direction from null gives an output of voltage of B phase. When the armature in the transmitter is asymmetrical to furnish an output from its secondaries, and the armature of the receiver is asymmetrical in the proper direction to furnish a noutput from its secondaries equal to and cancelling the output of the transmitter, the circuit is also balanced.

Let it be assumed, as purely illustrative, that a transformer 1 is operatively associated with a temperature-responsive device of a variably heated element such as the bi-metallic element 7. That a transformer 2 is operatively associated with a pressure-responsive device, subjected to variable high pressures, such as a Bourdon tube 8, for instance, and that transformer $n$ is operatively associated with a low pressure element such as bellows 9. Obviously, there may be any number of additional pick-up units between 2 and $n$. Although these may be independent elements, it will usually be preferred that they be associated with or in a common entity having plural variables as conditions which must be both watched and controlled. Illustratively, such an entity involving simultaneously a plurality of separate variables might be an oil-still or the like.

An amplifier unit 15 is provided into which the operating line voltage is fed from a suitable A. C. source, and into which the signal from each of the transmitters or pick-ups is fed in alternation selectively. A two phase reversible motor 16 is provided, having suitable gearing, including reduction gearing to be described, to drive the substantially transparent cylindrical drum 17 angularly between stop limits so that its travel is less than 360°, and having leads from the resultant output of the amplifier, as well as leads to the line voltage for the circuit. A receiver differential transformer 3 is provided, formed of the central exciting primary 12' and the axially spaced secondaries 10' and 11' concentric with the axis of the primary coil, and having the physically movable armature 13' mounted on the link 14', with the latter operatively coupled to and movable with the motor 16 or drum 17. This coupling is in such manner that the physical disposition of the armature 13' relative to the stator formed of the coils 10', 11' and 12' is a function of the angular position of the drum 17, having a maximum position away from null in one direction at one limit of angular movement of the drum, and having a maximum position away from null in the other direction at the other limit of angular movement of the drum, as will be explained in connection with Fig. 3.

The circuit includes, in the preferred but illustrative embodiment, a biased single throw switch for each pick-up unit, preferably manually operated, identified respectively as S1, S2 and S$n$, and each comprising for convenience four sets of contacts, corresponding sets in each switch being identified as "$a$," "$b$," "$c$," and "$d$," respectively, with functions to be described, although contacts "$d$" of switch S1 may have no function. Contacts $a$ of all switches are all normally closed. Finger pieces or handles respectively 4, 5, and 6$n$ are associated with the respective switches S1, S2 and S$n$.

A plural position, shown illustratively as a three position reflector or mirror 20, to be described in detail later herein, is provided, having a plurality of electromagnets, illustratively two, respectively 21 and 22, each controlling one angular position of the mirror 20, selectively fed by a D. C. output from the amplifier unit 15.

With the circuit arrangements as just recited, it will be seen that one primary lead and one secondary lead of each pair of coupled secondaries of each pick-up or transmitter 1, 2 and $n$ are common and are fed directly to the amplifier. The remaining primary lead from each pick-up is fed through the contacts $c$ of its particular selector switch through the primary 12' of the balancing or receiver transformer 3 and then back to the preferred 6 v. A. C. source in the amplifier. The remaining secondary lead from each pick-up is fed through contacts $b$ of its particular selector switch through the secondary of the balancing receiver transformer and then back to the amplifier input. A common line runs from a D. C. output of the amplifier unit to one contact of the pair of normally open contacts $d$ of pick-up unit switches S2 and S$n$, while the complemental contacts of each of said pairs are connected respectively to the electromagnets 21 and 22 through a common lead back to the amplifying unit 15.

When the selector switches are undepressed or in their normal neutral position to which they are normally biased, the normally closed contacts a of all of the switches are in series and short out the external circuit so that the motor moves the indicator drum and the coupled receiver transformer armature, to mid position or mid scale, where the balanced circuit will normally maintain all of the moving parts, including the armature of the balancing receiver transformer. This is in order to expedite the operation of the device so that upon depressing any key selector switch, the indicator drum will only have to move a maximum of half scale under any operating conditions.

As any selector switch is depressed by its finger control element to be identified later herein, its pick-up or transmitter unit is connected into the measuring circuit. At the same time, the common circuit through contacts a of all switches is opened. Of course, but one selector switch is to be actuated at a time, and if necessary interlocking elements (not shown) can be used to insure the operation of but one switch at a time.

As each selector switch having operative contacts d is depressed against the bias, the said contacts d thereof are closed, which energizes the appropriate electro magnet to swing the mirror in the manner to be described, at the same time that the particular transmitter is placed in circuit with the balancing receiver by contacts b, in order to actuate the indicator. The pick-up switch S1 and all other pick-up units using the same scale as is associated with pick-up 1, as noted, does not actuate the mirror. In the circuit shown the electromagnet 21 controlled by switch S2 rotates the mirror counterclockwise, and all other pick-ups having the same scale as is associated with pick-up 2 will have operative connections with the same electromagnet. The magnet 22 controlled by switch S$n$ rotates the mirror clockwise, and, of course, all other circuits using the same scale as that associated with pick-up $n$ will be operatively coupled to the same electromagnet.

The indicator is housed in a housing or box 23 having a front wall panel 24 through which the respective switch finger elements 4, 5, 5' and 6$n$ extend as shown, as illustrative of any plurality of variables to be indicated. A master switch 25 controlling the circuit from the line to the amplifier and motor is also provided as shown. The front panel 24 carries the motor and indicator assembly, to be described in detail, and at the top has a vertically elongated relatively narrow window 26, which is preferably covered or closed by a ground glass plate 27, but this may be omitted from the window or the element 27 can be a transparency if it is desired to project indications through the window on a target, wall, or screen spaced from the front panel. The housing has the front panel 24 preferably arranged as a door, and has side walls 28, top and bottom walls 29, and a rear panel or wall 30. The mirror assembly, to be described, either fixed or oscillatable as circumstances require, is mounted on the rear panel.

Referring now to Figs. 3 and 6, a hollow cylindrical substantially transparent indicator drum 17 is provided, mounted for rotation by a shaft 32, journalled horizontally in a supporting gear train frame 33, mounted on the inner surface of the front panel 24. The reversible two phase motor 16 is firmly mounted on the gear train frame 33 in position to have its drive shaft 34 actuate a gear reduction train of gears and shafts 35, journalled in the frame 33. The final pinion gear of the reduction train 35 engages the outer periphery of the large gear 36, mounted on the oscillatable shaft 32, to drive the drum 17 in one direction or the other about its axis in shaft 32. The position of the drum 17 will therefore be as a result of a predetermined running of the motor 16. In order to effect control of the receiver unit transformer 3, the frame element 33, and the parallel plate 33' carried thereby and forming part of the gear train frame are provided with aligned horizontally spaced apertures, in which flanged link-receiving and guiding bushings are mounted, respectively at 37 and 38. Link 14' is mounted for horizontal axial motion so that the transformer armature 13' carried thereby is axially adjusted relative to the transformer unit 3. The bushing 37 is merely a sliding guide for the link, but the bushing 38 is internally threaded to receive the threaded free end 40 of the link 14'. The bushing 38 has a reduced portion 41 leading to a shoulder 42 and upon which the spring washer 43 is mounted for frictional engagement on frame 33. Gear 44 has a pressed tight fit on axial extension 41, locking the washer 43 to the bushing 38, against shoulder 42. The gear 44 is in mesh with a worm shaft 45, the actuating end of which extends through the front panel 24. The link 14' carries a driving split gear 46 in permanent mesh with the teeth of the large gear 36 of the drum 17 with one portion keyed or affixed to the shaft 14' and the complemental portion affixed to the shaft by a spring 31 in such association as to substantially obviate lash between gears 46 and 36. When the large gear 36 rotates, the threaded link 14' is rotated through the action of the split gear 46, and the armature 13' is moved axially in and relative to the stator of the transformer 3, because the bushing 38 is held stationary by the friction and the said bushing is internally threaded. However, when exact and minute adjustments of the armature 13' in the stator of the transformer are required, with the motor 16 stationary, rotations of the worm shaft drives the small gear 44 and thereby the bushing 38 in its aperture, to move the stationary armature link 14' axially without rotation thereof. Very delicate adjustments are thereby effected, and the armature motions thereafter are tied accurately into the drum positionings. When it is realized that the entire controlling motion of the armature 13' may be of the order of $\frac{1}{16}$ of an inch or less, the necessity for such accurate adjustments will be obvious.

The surface of the drum indicator is calibrated with at least one column of calibrations or a scale 48, coordinated with the percentage of angular motion ascribed to the drum in moving between its angular limits and representing a predetermined function of the variations in condition of a selected control device and transmitter for operative association with said scale, or with a plurality of independent pick-up units if the variables respectively affecting same are of the same order as to fit the same scale 48 for proper indications. If but one scale is used the mirror 20 can be stationary. To exemplify the possibilities of the system disclosed, it is preferred that there be a plurality of rows of calibrations, and illustratively two rows 50 and 51 on either side of the central row or series 48. As noted, there may be an infinite number of sensing or transmitter circuits, and all of those which can be indicated by any single given scale on the indicator drum are arranged to selectively couple the instant circuit with the mirror assembly in such way as to expose the mirror to reflect the same scale reading for each of the plurality upon or through window element 27.

Within the hollow indicator drum 17 there is mounted a light source 52, mounted on a support 52' and a pair of condensing lenses indicated by the block 53, so arranged that light passing simultaneously through the several rows of calibrations, is focused into a concentrated beam directed rearwardly of the housing and upon mirror 20. While, as will be seen, the angle of beam projection is only important from the standpoint of the reflection angle thereof, to be described, which is affected by the angle of mirror 20 to the vertical, it has been found satisfactory to project the beam upwardly at an angle to the horizontal at about 15° thereto against a vertical mirror 20. It will be understood that the projected beam will be of such width as to transmit all of the rows of calibrations at once, so as to be laterally of proper width for this purpose, while being vertically of great enough distance as to indicate enough of the calibrations as to enable a fair reading thereof. In other words, when the indicator drum is in the mid or null position, the central calibrations indicating 50% of the scale length or the mid point of the calibrations thereof will be in the vertical center of the projected beam, with enough additional calibrations vertically on both sides of the middle position as to facilitate instantaneous readings thereof, when suitably magnified and reflected, as will be described.

At the rear of the housing, a webbed bracket 55 is provided, having a vertical flange 56 secured to the rear wall panel 30, and having a forwardly extending horizontal portion 57 upon which is mounted a magnifying lens 58, adjustable axially for purposes of focusing, and arranged to be juxtaposed to the drum indicator 17 to receive the projected beam passing radially outwardly therefrom. At the rear the bracket 55 supports the rigid compound bracket comprised of the forward lug 59 and the rearward, transversely extending magnet supports 60 and 61, upon which, respectively, the electromagnets 21 and 22 are rigidly supported. The brackets 59 and arms 60 and 61 are substantially integral with a multiple pivot stationary housing comprising a front plate 49 terminating laterally in the vertically extending horizontally spaced rearwardly directed knife edges, respectively 62 and 63, evenly spaced on each side of the median line of the reflector unit, and having upper and lower rearwardly extending parallel plates or lugs 64 and 65 respectively. This last unit forms a substantially or effectively square box, the upper and lower lugs or plates of which form vertical guide stops for the plate to be described, and the lateral edges of which form pivot lines for the said plate.

The mirror 20 is firmly mounted on a tiltable or oscillatable supporting assembly of a rear plate of inverted generally T formation having the upper mirror mounting portion 66 and the cross piece forming lateral plates of magnetic material 67 and 68, juxtaposed to and affected by the respective electromagnets when the latter are energized. On the front of the T-shaped plate a pivot plate 70 is firmly attached, having upper and lower parallel horizontal surfaces of such vertical spacing as to slide between the plates or lugs 64 and 65 to limit the relative vertical movements of the T plate in either direction, and provided with parallel vertical horizontally spaced notches 71 and 72. A pin 73 is anchored in the T plate and the pivot plate, and extends through the enlarged aperture 74 in the rocking housing 49, and is connected resiliently by tension spring 75 to the fixed lug 59. It will be seen that energization of the electromagnet 21 will pull the adjacent ear or plate porttion 67 toward itself to a rigid stop, causing the T plate to rock about knife edge 62 in socket recess 71, as a pivot, causing the recess 72 to pull away from its stationary knife edge 63 to effect a fixed angular change of mirror position in moving clockwise about the operative fixed pivot 62. On the other hand, release of the electromagnet 21 will release the T plate to permit the mirror to swing counterclockwise about the pivot knife edge 62 until both knife edges are engaged by their respective notches, when the mirror will be held rigidly in its mid position. From this latter position, as will be clear, and as shown in Fig. 9, energization of the electromagnet 22 will cause attraction of the magnetic plate portion 68, to swing the mirror mounting assembly counterclockwise about the knife edge 63, with positive stopped abutment against the magnet so that the mirror is rigidly mounted at a cocked angle between two horizontally spaced stops. There will be an automatic subsequent clockwise movement of the mirror mounting assembly upon de-energization of the electromagnet, to rigidly support the mirror on two horizontally spaced stops against which it is held by the tension spring. The accuracy and stability and freedom from response to vibrations attained by the utilization of the spaced pivots and the rest of the rocking assembly will be evident.

It is preferred that a datum or hair line be furnished for the indicator which will be permanently projected on the vertical center of the window element 27 at all angular positions of the mirror. This is satisfactorily accomplished by providing an adjustable bracket 80 carrying the vertically narrow sheet of transparent plastic 81 with a horizontal preferably bevelled free edge 82 disposed in the path of the beam projected from the drum indicator so as to cover approximately one-half of said beam, in such manner that by refractive effects the edge 82 of the interposed plastic sheet forms a thin shadow, functioning as a hair line for the projected beam. The datum line projector is disposed closely adjacent to the drum indicator, and is permanently fixed after once being adjusted and set. Of course, any other mode of presenting a datum line on the window element 27 may be used if desired.

It will be understood that the beam passing through the magnifying lens will be more or less symmetrical about a center line which is inclined upwardly predeterminedly from the horizontal, say, at approximately 15° as noted, and which angle of incidence of the center line on the vertical plane mirror will be equalled by the angle of reflection therefrom, so that the reflected beam passes forwardly in the housing vertically clear of the drum assembly on the vertically elevated window element 27. At the same time, the beam from the magnifying lens is diverging by both vertical and horizontal angular divergence from the symmetrical center line thereof, so that it strikes or is incident upon the plane mirror 20 with various angles of incidence, which are enhanced by the additive angles of reflections respectively attained by various portions of the diverging beam so as to effect a magnification of the beam both vertically and horizontally relative to the center thereof, as shown respectively in Figs. 1A and 1B so that the initial beam from the indicator drum is magnified in all directions when finally incident upon the inner surface of the front panel adjacent to and covering the window element 27. The readings of the portions of the total beam permitted by the instant angularity of the plane mirror 20 will be with such spread between adjacent calibrations as to be easily and clearly read and observed with reference to the datum line. It will be understood that the scales as placed upon the indicator drum are quite small and the calibrations are quite close together, certainly, at least, in contrast to the ultimate projection thereof.

In operation, the indicator drum is operatively coupled with as many transmitter devices as necessary for the particular purposes required, and these may be anywhere remote from the instrument, as all that is required is the variable responsive device and the coupled transmitter at the work, with electrical leads therefrom to the instrument. The switches for the various variables will be mounted in the instrument, preferably, with finger operating elements at convenient points as indicated in the front of the panel 24 in Fig. 1. With the master switch 25 set, but with all pick-up unit switches undepressed, the light source 52 will be functioning, and all of the lens having been previously adjusted, the drum indicator will remain in or be automatically swung to its substantially mid position, so that an instantaneous projection of the beam through the lenses and against the mirror 20 in its fixed un-cocked position and from the mirror against the inner surface of the panel 24 will show a magnified projection of the middle portion of the center scale at the window 26. All other calibrations in the beam will be against the inner surface of the panel 24 but will be unobserved. This is the normal neutral position of the parts.

As noted, there will be as many key switches as there are variables to be considered, for each of which there is a pick-up unit. This infinite range of numbers of switches and pick-up units is indicated by the fact that after pick-up units 1 and 2, the third one shown is designated as "n." With no switch depressed, as previously noted, the drum and therefore the coordinated armature 13' is in the null mid position. Let it be assumed that at this point the finger element 4 associated with pick-up 1 is depressed against its spring bias, which places pick-up 1 in circuit with the amplifier 15, motor 16, and the receiver unit 3. If the relative dispositions of the armatures 13 and 13' are not identical in their respective stators, because there has been a departure of the instant condition of the conditioned device, to which pick-up 1 is responsive, there will be an output voltage from the pick-up which will run the motor 16 in the proper direction so as to move the indicator drum, while at the same time the threaded link 14' will have been moved axially to move the armature 13' in its stator until the cancelling output of the latter transformer balances that of the pick-up, at which point the motor 16 will stop and the drum will have moved to an angular position representative of the initial unbalance as a function of the deviation of the condition affecting pick-up 1. In this case the mirror 20 is not moved and the magnified beam striking the mirror is reflected with enhanced magnification against the window element 27 and against the inner surfaces of the front wall on each side thereof. As soon as the depressed switch 4 is released, the initial normal setting of the instrument takes place, and the drum 17, if previously moved, returns automatically toward the mid position or setting.

When switch 5 is depressed the pick-up unit 2 is placed in circuit with the amplifier, motor and receiver 3, and if unbalance exists between the two transformers the motor will be actuated and the drum turned until the receiver armature has been again moved toward cancelling out the unbalance caused by the pick-up response to the instant condition. In this case, the electromagnet 21 will be actuated also, and the mirror given a cock or angular change so as to reflect the pattern of the illustrative three sets of calibrations asymmetrically of the window, so that the calibrations 51 will be the ones appearing on the ground glass 27, or transmitted through the window upon a target spaced from the instrument.

There may be a number of pick-ups affected by individual variables of a plurality of variables, which may be more or less related, each pick-up respectively having finger elements of switches operable from the front of the panel and selectively energized to cause transmission of the reflection of the same scale, modified in each instant case by the particular degree of variation of the instant variable. These respective variables are each capable of being represented by the same set of calibrations. To illustrate the point it will be assumed that the finger element of switch 5', shown in Fig. 1, actuates the switch of a pick-up unit (not shown) arranged for indications by the same set of calibrations 51 as is brought into operation by switch 5, in which case the same electromagnet 21 will be actuated to swing or cock the mirror 20 to project the same set of calibrations 51 against the window element 27, even though in the illustrative case the particular variable for switch 5' may be at a different condition from that ascertained of the pick-up unit associated with switch 5.

It will be seen that a controlling operator can stand in a single point and by merely depressing appropriate keys or switches, can progressively have an indication of the condition of a multitude of variables through a common sight opening, by clustering the responsive devices in the common housing disclosed.

The simplicity, efficiency and advtantages of the invention will be apparent.

Matter disclosed but not claimed herein is being claimed in a continuation-in-part application, Ser. No. 208,389, filed January 29, 1951.

Having thus described our invention, we claim:

1. A multiple indicator comprising a circuit network, plural means in the network for operative association respectively with a plurality of variables, a plurality of selector circuit controllers in the network, an electric servomotor in the network and arranged to be operated by any selected one of said plural means when the appropriate selector circuit controller is actuated, a viewing screen, an indicator having a plurality of rows of calibrations in mutually spaced relation transversely of the rows, means mounting the indicator in driven relation to said motor to move the indicator substantially in the line of said rows to a setting in which a selected scale of said plurality is positioned as a function of the condition of a given selected variable determined by actuation of a given selected controller, light means for projecting a portion of all of said scales simultaneously from said indicator toward said viewing screen in a beam of larger transverse area than said screen, said light means including means for predetermining and varying the angle of incidence of said projected beam relative to said screen so that selectively any single selected scale of said plurality can be made incident on said screen, and electrical means operatively associated with said last means and controlled by said given selected controller to cause the angle of incidence of the projected beam to be such relative to the screen that the said selected scale of the plurality is incident on said screen.

2. A motor driven indicator comprising an indicator having a plurality of scales, an electric servomotor in driving relation to the indicator, a viewing screen, a plurality of selector switches, a network containing the motor and selector switches, and means for optically magnifying and projecting toward the screen a beam comprising a portion of each of the said plurality and of greater width than the width of the screen, and electrical means controlled by said switches for predetermining the specific necessary angle of incidence of said beam relative to the screen of a plurality of such angles whereby a selected one only of said plurality of scales in incident on the viewing screen.

3. A multiple indicator comprising an arcuate cylindrical indicator having a plurality of scales extending respectively angularly of the arcuate portion in transversely spaced rows, a datum line common to all of the scales, an electric servomotor in driving relation to said indicator to position same, a viewing screen, light means for projecting angular portions of all of said scales, an optical system including a reflector for magnifying and reflecting said projected portions toward said viewing screen at a given angle of incidence thereon and in a beam wider than the screen, whereby with said given angle of incidence but a single scale of the reflected portions of the plurality can properly be viewed therein, and means for varying the angle of the reflector of said optical system relative to the light means to change the given angle of incidence to a different angle to effectively establish the beam relative to said screen so as to cause a different selected single scale of said plurality to be incident upon said viewing screen.

4. An electric servomotor driven indicator having a plurality of scales, a reflector, a viewing screen, and means for optically magnifying and projecting a portion of all of said scales toward the reflector for incidence thereon, means mounting the reflector for a setting relative to the projection at which the projected portions of said scales are reflected toward and on said screen, said screen being smaller than said reflected portions of said plurality of scales whereby a given single scale only of said plurality of scales is incident upon and readable on the screen, and means for selectively moving said reflector on its mounting to modify the said setting to change the effective angle of incidence of the reflected plurality of scales relative to said screen whereby a predeterminedly different scale only of said plurality of scales is incident and viewable upon said screen.

5. An electric servomotor driven indicator having a plurality of scales, a reflector, a viewing screen, and means for optically magnifying and projecting a portion of all of said scales toward the reflector for incidence thereon, means mounting the reflector for a setting relative to the projection at which the projected portions of said scales are reflected toward and on said screen, said screen being smaller than said reflected portions of said plurality of scales whereby a given single scale only of said plurality of scales is incident upon and readable on said screen, and means for selectively moving said reflector on its mounting to modify the said setting to change the effective angle of incidence of the reflected plurality of scales relative to said screen whereby a predeterminedly different scale only of said plurality of scales is incident and viewable upon said screen, said means for moving said reflector comprising a plurality of selectively energizable electro-magnetic units.

6. An electric servomotor driven indicator having a plurality of scales, a reflector, a viewing screen, and means for optically magnifying and projecting a portion of all of said scales toward the reflector for incidence thereon, means mounting the reflector for a setting relative to the projection at which the projected portions of said scales are reflected toward and on said screen, said screen being smaller than said reflected portions of said plurality of scales whereby a given single scale only of said plurality of scales is incident upon and readable on said screen, and means for selectively moving said reflector on its mounting to modify the said setting to change the effective angle of incidence of the reflected plurality of scales relative to said screen whereby a predeterminedly different scale only of said plurality of scales is incident and viewable upon said screen, said means for moving said reflector comprising a plurality of selectively energizable electro-magnetic units, said mounting means comprising a fixed two point support, a plate having wings, resilient means holding said two point plate against the support to establish said given angle of incidence, electro-magnetic means between the support and said respective wings operative to tilt the plate and reflector.

7. A multiple scale indicator comprising an electric servomotor, an indicator positioned by the running of the motor and bearing a plurality of scales, a viewing screen, means for projecting a light pattern containing portions of a plurality of said scales larger than said screen toward and overlapping said screen, said pattern projection normally having an angle relative to the screen such that a portion of only a single predetermined scale of the projected plurality is incident and viewable upon the screen, an input source, a circuit controller operative to couple the input source and the motor, and electrical means responsive to actuation of said circuit controller to change the normal angular incidence of said pattern on said screen to establish a different overlap thereon whereby a portion of another scale of said projected plurality is solely incident and viewable on said screen.

8. An optical indication system, comprising movable means bearing a plurality of separate parallel transversely spaced visible scales, a viewing screen comprising an opaque area containing and transversely framing a sight window, means for generating and for projecting from said movable means against said viewing screen a light beam containing at the viewing screen a light pattern of magnified portions of all of said scales, said beam having a generally symmetrically disposed effective focal axis intersecting said viewing screen, means for controlling the angles of incidence of said effective focal axis relative to said screen between an instantaneously maintained first angle at which a portion of one selected single magnified scale only of the plurality of scales in said pattern is incident upon and framed in said sight window and an instantaneously maintained second predeterminedly different angle at which a portion of another selected single magnified scale only of the plurality of scales in said pattern is incident upon and framed in said sight window, said controlled change in angles of incidence being transverse of the magnified scales in said pattern, means mounting the movable means for movement in the general line of the respective visible scales thereon, and electric servomotor means for moving and positioning said movable means to determine the portions of all of the scales appearing in said pattern.

9. An indication system as recited in claim 8, in which the means for projecting and the means for controlling incorporate an oscillatable mirror.

10. An indication system as recited in claim 8, incorporating an electrical network with which said electric servomotor is operatively coupled, and in which the respective means for projecting and for controlling incorporate an oscillatable mirror, and said network including electromagnetic means for controllably oscillating said mirror, and common means are provided in the network for actuating said servomotor to position the movable means as a related function of one given visible scale thereon and for controlling the electromagnetic means to effect a selected angle of incidence of the focal axis of said beam to said screen, whereby the magnified portion of said given scale only in the pattern of the plurality of scales is framed in said window.

11. An indication system as recited in claim 8 in which means are provided for controlling the servomotor means to position the movable means as a related function of one selected visible scale thereof, and in which the controlling means effects that angle of incidence of the beam at which the single said selected visible scale in the projected pattern in the light beam is framed in said window.

WILLIAM DEAN MACGEORGE.
CHARLES E. ROESSLER, Jr.

REFERENCES CITED

The following references are of record in the file of this patent:

UNITED STATES PATENTS

| Number | Name | Date |
|---|---|---|
| 393,756 | Griscom | Dec. 4, 1888 |
| 1,361,676 | Brewer | Dec. 7, 1920 |
| 1,451,166 | McCarthy | Apr. 10, 1923 |
| 1,487,514 | Goss | Mar. 18, 1924 |
| 1,641,199 | Roucka | Sept. 7, 1927 |
| 1,660,886 | Randall | Feb. 28, 1928 |
| 1,715,074 | Platten | May 28, 1929 |
| 1,880,415 | Carroll | Oct. 4, 1932 |
| 1,882,772 | Carroll | Oct. 18, 1932 |
| 1,913,874 | Folberth | June 13, 1933 |
| 1,933,650 | Bascom | Nov. 7, 1933 |
| 2,126,059 | Turner | Aug. 9, 1938 |
| 2,154,066 | De Giers | Apr. 11, 1939 |
| 2,207,744 | Larson | July 16, 1940 |
| 2,226,441 | Paul | Dec. 24, 1940 |
| 2,328,320 | Baruch | Aug. 31, 1943 |
| 2,421,077 | Miller | May 27, 1947 |
| 2,504,386 | Brady | Apr. 18, 1950 |